United States Patent [19]
Sun et al.

[11] Patent Number: 5,656,888
[45] Date of Patent: Aug. 12, 1997

[54] OXYGEN-DOPED THIOGALLATE PHOSPHOR

[76] Inventors: Sey-Shing Sun, 15375 SW. Nightingale Ct., Beaverton, Oreg. 97007; Eric R. Dickey, 18185 NW. Cambray, Beaverton, Oreg. 97006; Richard T. Tuenge, 30336 SW. Egger Rd., Hillsboro, Oreg. 97123; Randall Wentross, 3271 NW. Huckleberry Pl., Corvallis, Oreg. 97330

[21] Appl. No.: 555,644

[22] Filed: Nov. 13, 1995

[51] Int. Cl.$^6$ .................................................. H05B 33/14
[52] U.S. Cl. ............................ 313/503; 313/506; 313/509
[58] Field of Search ......................................... 313/503, 506, 313/509; 252/301.4 R

[56] References Cited

U.S. PATENT DOCUMENTS

| | | | |
|---|---|---|---|
| 5,309,070 | 5/1994 | Sun et al. | 313/503 |
| 5,589,059 | 12/1996 | Sun et al. | 313/509 |

OTHER PUBLICATIONS

"A Model for Emissions from ZnS:Ce$^{3+}$ and SrS:Ce$^{3+}$ Thin–Film Electroluminescent Devices," S.H. Sohn, et al., Japan Journal of Applied Physics, vol. 31(1992) pp.3901–3906. Oct.

"Effects of Oxygen on Electroluminescent Characteristics of ZnS:TbOF and ZnS:TmOF devices," S.H. Sohn, et al., Journal of Applied Physics 72 (10 Nov. 1992).

"Luminescence of Eu$^{2+}$ in Strontium and Barium Thiogallates," M.R. Davalos, et al., Journal of Solid State Chemistry, vol. 83, pp. 316–323 (1989). Aug.

"32.1: A New Class of Blue TFEL Phosphors With Application to a VGA Full–Color Display," W.A. Barrow, et al., SID 93 Digest, 1993. (no month).

"Electroluminescence and Photoluminescence of Cerium–Activated Alkaline Earth Thiogallate Thin Films and Devices," S–S. Sun, et al., Journal of the Electrochemical Society, Inc., vol. 141, No. 10, Oct. 1994.

*Primary Examiner*—Nimeshkumar Patel
*Attorney, Agent, or Firm*—Chernoff, Vilhauer, McClung & Stenzel

[57] ABSTRACT

A novel thin-film electroluminescent (TFEL) structure for emitting light in response to the application of an electric field is disclosed. The TFEL structure includes first and second electrode layers sandwiching a TFEL stack, the stack including first and second insulator layers and a phosphor layer that includes an alkaline earth thiogallate doped with oxygen.

12 Claims, 2 Drawing Sheets

OXYGEN-DOPED THIOGALLATE PHOSPHOR

This invention relates to a thin-film electroluminescent (TFEL) structure and more particularly to a TFEL structure including an alkaline earth thiogallate phosphor.

BACKGROUND AND SUMMARY OF THE INVENTION

Thin-film electroluminescent structures are of great interest because they offer a possible means of achieving a high performance flat panel color display. The search for an efficient blue light-emitting phosphor is intense because a blue light-emitting phosphor having sufficient luminance and efficiency is a prerequisite for the color flat panel display application. In recent years researchers have focused on producing a stable phosphor that is capable of emitting blue light of the required chromaticity and intensity.

Research has previously focused on cerium-doped strontium sulfide and thulium-doped zinc sulfide. Unfortunately, the SrS:Ce phosphors are chemically unstable and have poor color purity, and the ZnS:Tm phosphors demonstrate poor luminance.

Sohn and others have reported that incorporating oxygen into terbium-doped zinc sulfide improved the crystallinity of the ZnS, lowered the threshold voltage of the phosphor and increased phosphor luminance, in "Effects of Oxygen on Electroluminescent Characteristics of ZnS:TbOF and ZnS:TmOF Devices," *J. Appl. Phys.*72, 4877–83 (1992). Sohn and others report that oxygen doping increased the luminance of cerium-doped zinc sulfide, in "A Model for Emissions from $ZnS:Ce^{3+}$ and $SrS:Ce^{3+}$ Thin-Film Electroluminescent Devices," *Jpn. J. Appl. Phys.* 31, 3901–06 (1992).

Investigators have identified rare earth doped alkaline earth thiogallate compounds as efficient blue light and green light-emitting phosphors suitable for use in thin-film electroluminescent panels, as shown, for example, in U.S. Pat. No. 5,309,070 to Sun et al.

The electroluminescent emission spectrum of cerium-doped strontium or calcium thiogallate shows overlapping double bands with two peaks. The emission spectrum of the excited $Ce^{3+}$ ion results from transitions from the same $5d$ excited state to the $4f$ ground state. Two peaks result because the $4f$ ground state is a doublet. However, since the $5d$ excited state of $Ce^{3+}$ is not shielded by the $5s^25p^6$ shells and therefore is easily affected by the crystal field, the transition energy varies with the host materials. The wavelengths of the cerium emission peaks in strontium thiogallate are 445 nm and 490 nm; the emitted light has a deep blue color with CIE coordinates of x=0.15, y=0.10. The wavelengths of the cerium emission peaks in calcium thiogallate are shifted about 15 nm to longer wavelengths due to a stronger crystal field; the emitted light has CIE coordinates of x=0.15, y=0.20. Thus, the color of light emitted by cerium in calcium thiogallate is not as deep a blue as the light emitted by cerium in strontium thiogallate.

The human eye is more sensitive to green light than to blue light. Therefore, the same number of photons (radiative quantity) will produce more luminance (photopic quantity) from cerium-doped calcium thiogallate than from cerium-doped strontium thiogallate. In addition, the luminous efficiency (lumens/watt) of cerium-doped calcium thiogallate is almost twice that of cerium-doped strontium thiogallate. However, when the luminous efficiency is normalized by the spectral luminous efficacy (the ratio of the photopic output to the radiative input) to obtain the radiative efficiency, one finds that the radiative efficiency of cerium-doped calcium thiogallate is not much higher than that of cerium-doped strontium thiogallate.

In a full color electroluminescent display the blue light-emitting phosphor determines the chromaticity and luminous efficiency of the white light when all primary color light-emitting phosphors are emitting. Thus, the performance of the blue light-emitting phosphor must be optimized. The radiative efficiency is a better gauge than the luminous efficiency for evaluating the performance of a blue light-emitting phosphor. The higher the radiative efficiency of the blue light-emitting phosphor, the higher the luminous efficiency of the emitted white light. The improvement in the radiative efficiency of the blue light-emitting phosphor may be due either to an improvement in the emission color to a deeper blue chromaticity, or to an improvement in the brightness, that is, a higher luminous efficiency.

Thus, a need still exists for an efficient blue light-emitting phosphor suitable for use in full color TFEL panels.

According to the present invention, such a need is satisfied by a thin-film electroluminescent (TFEL) structure for emitting light in response to the application of an electric field that includes first and second electrode layers sandwiching a TFEL stack, the stack including first and second insulator layers and a phosphor layer that includes an alkaline earth thiogallate doped with oxygen.

The foregoing and other objectives, features, and advantages of the invention will be more readily understood upon consideration of the following detailed description of the invention, taken in conjunction with the accompanying drawings.

Detailed Description of the Preferred Embodiment

Figure 1:
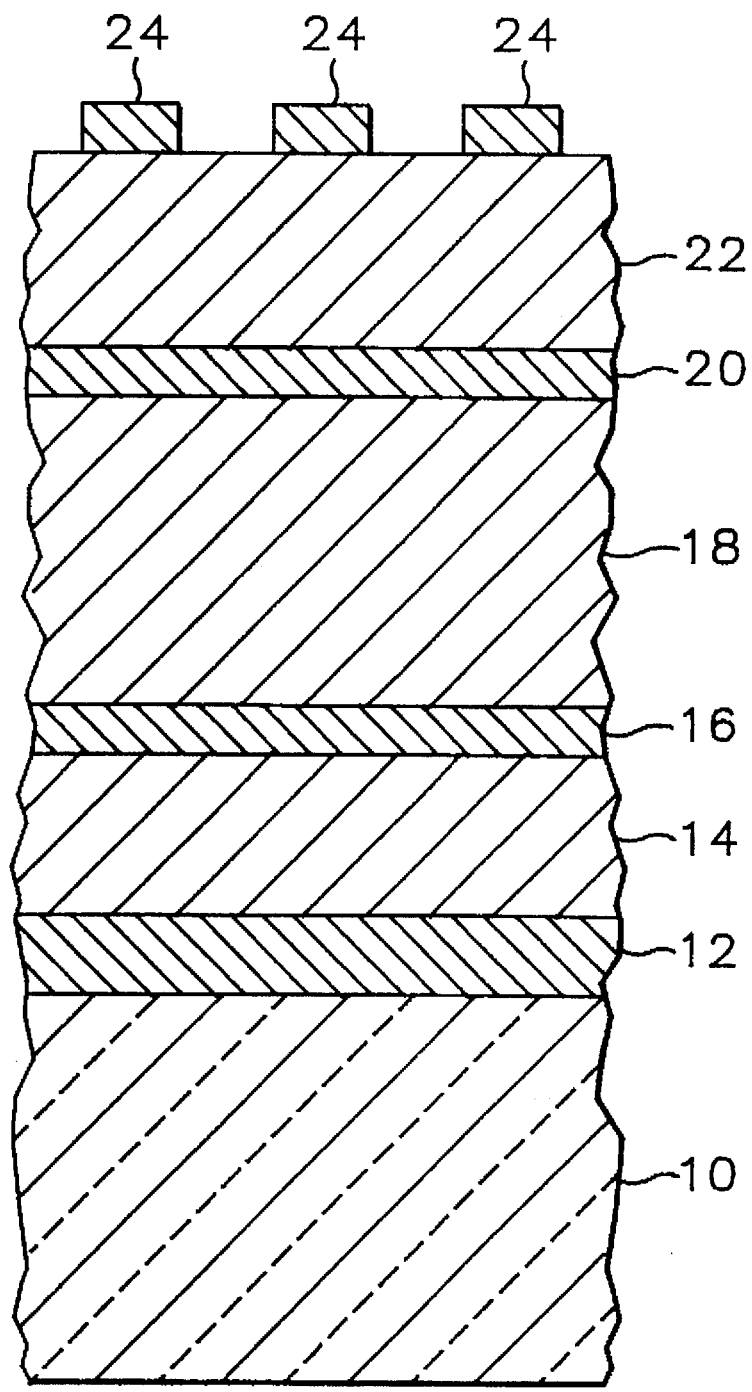
FIG. 1 is a sectional view of a TFEL device embodying the present invention.

Referring now to FIG. 1, a TFEL device fabricated according to the present invention has a glass substrate 10 which supports a first electrode layer 12 of transparent indium tin oxide (ITO). A first insulator layer 14 is deposited on top of the first electrode layer 12. The insulator layer 14 is made of a material having a high dielectric constant ($\epsilon=15$ to 100) such as a multi-layered alumina-titanate oxide (ATO), $\epsilon=18$, a barium tantalate (BTO), $\epsilon=25$, or a barium-strontium titanate (BST), $\epsilon\cong100$. A preferred first insulator layer 14 is ATO deposited in a layer having a thickness of 3000 Å (300 nm). A layer 16 of zinc sulfide which is between 50 to 600 Å (5 to 60 nm) thick is deposited on the first insulator layer 14. A phosphor layer 18 is deposited on the zinc sulfide layer 16. The phosphor is an alkaline earth thiogallate doped with oxygen and including a dopant such as a rare earth dopant, lead or tin. The rare earth dopant is selected from the group cerium, europium and holmium. The alkaline earth is selected from the group calcium, strontium, barium and magnesium.

In a preferred embodiment, the phosphor is an oxygen-doped calcium strontium thiogallate including the rare earth dopant cerium. The phosphor layer preferably is formed by sputtering from a rare earth-doped thiogallate target which has been prepared with the desired composition while bleeding into the deposition chamber a controlled amount of oxygen gas to create an oxygen partial pressure in the chamber during the thiogallate deposition. Alternatively, the oxygen doping can be achieved by adding a source of oxygen, for example, a suitable alkaline earth oxide such as strontium oxide or calcium oxide, to the sputtering targets during target fabrication. Other suitable sources of oxygen include gallium oxide or cerium oxychloride. The phosphor layer 18 is deposited in a thickness between 6000 and 15,000 Å (600 and 1,500 nm). A second layer 20 of zinc sulfide between 50 to 600 Å (5–60 nm) thick is deposited on the alkaline earth thiogallate phosphor layer 18. After sputter-deposition, the stack is annealed to crystallize the phosphor. A second insulator layer 22 having a high dielectric constant, which may be the same or similar to the first insulator layer 14, is deposited on the second zinc sulfide layer 20. A preferred second insulator layer 22 is BTO in a layer 3000 Å (300 mm) thick. A second electrode layer 24 is deposited on the second insulator layer 22 and is preferably made of aluminum.

Several phosphors were prepared and the performance of an oxygen-doped alkaline earth thiogallate phosphor was compared to the performance of the same phosphor prepared without oxygen doping. The phosphors were calcium thiogallate, strontium thiogallate and calcium strontium thiogallate, $Ca_xSr_{1-x}Ga_2S_4$, where $0<x<1$. All of the phosphors included the same concentration of the rare earth dopant cerium; the fraction of the alkaline earth sites occupied by $Ce^{3+}$ was 0.03. An improvement in the luminous efficiency was found in the oxygen-doped calcium thiogallate phosphor and in the oxygen-doped calcium strontium thiogallate phosphor (x=0.5). The results are summarized in Table 1 below.

TABLE 1

Effect of oxygen doping on the performance of $Ca_xSr_{1-x}Ga_2S_4$:Ce phosphors, $0 \leq x \geq 1$.

| Oxygen Doping | Ca Fraction (x) | CIE (x) | CIE (y) | Dominant Ce Peak WaveLength (nm) | Relative Luminous Efficiency | Relative Radiative Efficiency |
|---|---|---|---|---|---|---|
| NO | 1.0 | 0.14 | 0.20 | 460 | 1.00 | 0.95 |
|  | 0.5 | 0.14 | 0.17 | 456 | 0.95 | 1.00 |
|  | 0.3 | 0.14 | 0.17 | 455 | 0.89 | 1.00 |
|  | 0.0 | 0.14 | 0.10 | 445 | 0.47 | 0.95 |
| YES | 1.0 | 0.14 | 0.20 | 460 | 1.50 | 1.40 |
|  | 0.5 | 0.14 | 0.13 | 446 | 1.65 | 2.40 |
|  | 0.3 | 0.14 | 0.13 | 446 | 0.87 | 1.30 |
|  | 0.0 | 0.14 | 0.09 | 445 | 0.36 | 0.80 |

The oxygen-doped calcium strontium thiogallate phosphor (x=0.5) demonstrates both improved emission color and improved luminous efficiency. The relative luminous efficiency of oxygen-doped $Sr_{0.5}Ca_{0.5}Ga_2S_4$:Ce is 10% higher than that of the oxygen-doped calcium thiogallate phosphor (x=1.0). In addition, the emission color of the oxygen-doped $Sr_{0.5}Ca_{0.5}Ga_2S_4$:Ce is a much deeper blue color than the color of the same phosphor without oxygen. The relative radiative efficiency of oxygen-doped $Sr_{0.5}Ca_{0.5}Ga_2S_4$:Ce is therefore significantly higher than that of the same phosphor prepared without oxygen doping.

Oxygen-doped $Sr_{0.5}Ca_{0.5}Ga_2S_4$:Ce phosphors were prepared with oxygen at concentrations that varied from 2 to 6 at. %. In each phosphor the fraction of the alkaline earth sites occupied by $Ce^{3+}$ was 0.03. The best radiative efficiency of the oxygen-doped $Sr_{0.5}Ca_{0.5}Ga_2S_4$:Ce phosphor was achieved with an oxygen concentration of about 4 at. %. At higher oxygen doping concentrations, the performance of the phosphor begins to degrade due to the formation of oxide. These results are presented in Table 2.

TABLE 2

The effect of oxygen doping concentration on the performance of $Ca_{.5}Sr_{.5}Ga_2S_4$:Ce

| Oxygen Concentration (at. %) | CIE (x) | CIE (y) | Relative Luminous Efficiency | Relative Radiative Efficiency |
|---|---|---|---|---|
| 2.0 | 0.135 | 0.165 | 1.00 | 1.00 |
| 3.1 | 0.135 | 0.156 | 1.43 | 1.50 |
| 4.2 | 0.135 | 0.135 | 1.71 | 2.20 |
| 5.3 | 0.136 | 0.144 | 1.64 | 1.88 |

Figure 2:
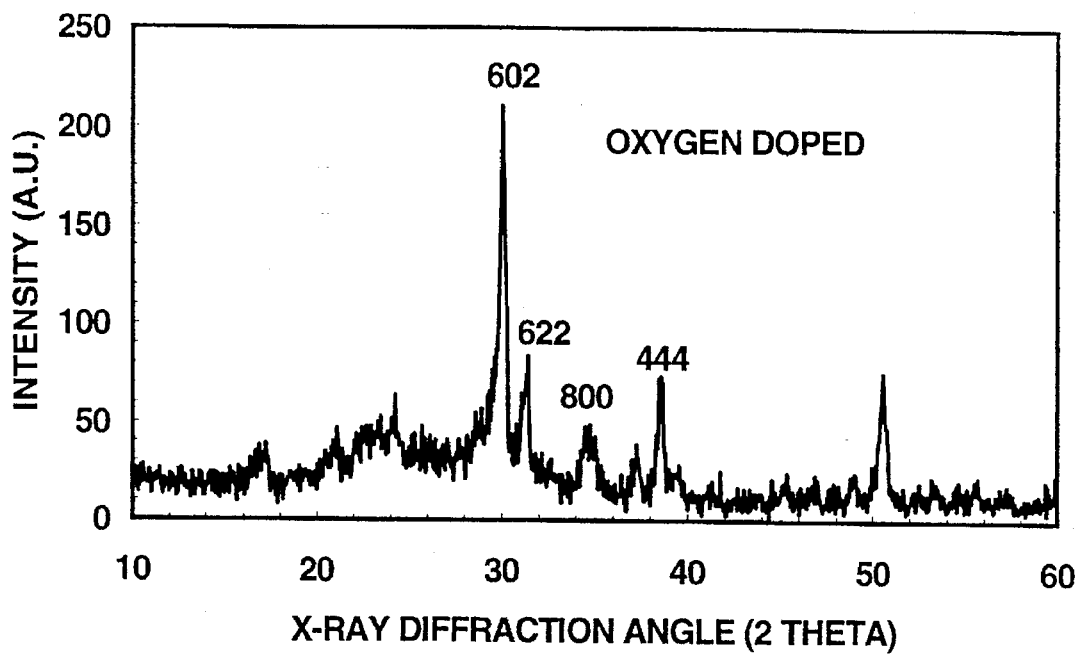
FIG. 2 is an X-ray diffraction pattern of an oxygen-doped thiogallate phosphor prepared according to the present invention.
Figure 3:
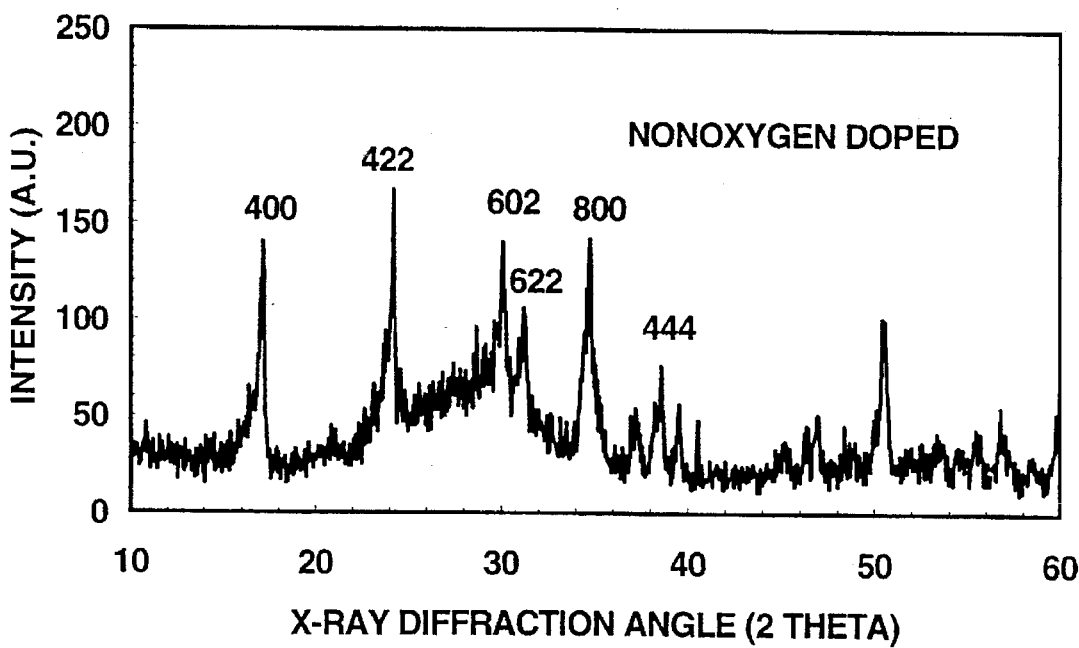
FIG. 3 is an X-ray diffraction pattern of the thiogallate of FIG. 2 prepared without oxygen doping.

Referring to FIGS. 2 and 3, an X-ray diffraction analysis shows that reflection from the plane having a (602) orientation in the thiogallate thin film was significantly enhanced by oxygen doping. In addition, electrical and optical studies show that the oxygen-doped devices have a better defined threshold than the nonoxygen-doped devices. Furthermore, the threshold field in alkaline earth electroluminescent thiogallate phosphor devices was found to be reduced from 2.8 MV/cm in devices without oxygen doping, to 2.5 MV/cm in devices with oxygen doping. Thus, although the mechanism responsible for the improvement in the radiative efficiency in oxygen-doped thiogallate phosphors is not clear, oxygen appears to enhance the crystallinity of thiogallate and to compensate for sulfur vacancies to eliminate the non-radiative transition paths at point defects or grain boundaries.

A color shift occurs in an oxygen-doped calcium strontium thiogallate phosphor compared to the same phosphor without oxygen doping, but oxygen doping does not cause a color change in a calcium thiogallate phosphor or in a strontium thiogallate phosphor (see Table 1). These results suggest that in cerium-activated calcium strontium thiogallate phosphors, oxygen doping causes cerium to substitute more frequently with strontium than with calcium. It is not clear how this result is achieved. Oxygen present in the thiogallate films may change the crystal field around the cerium ions by influencing the metal-sulfur bond distance of the metal with which the cerium substitutes.

The effect of oxygen doping is expected to be independent of the deposition method used. Therefore, the oxygen-doped thiogallate films may also be prepared with metallorganic chemical vapor deposition (MOCVD), atomic layer epitaxy (ALE), molecular beam epitaxy (MBE), and multi-source deposition (MSD) techniques.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A thin film electroluminescent (TFEL) structure for emitting light in response to the application of an electric field, comprising first and second electrode layers sandwiching a TFEL stack, said stack including first and second insulator layers and a phosphor layer comprising an alkaline earth thiogallate doped with oxygen.

2. The TFEL structure of claim 1 wherein said stack further includes zinc.

3. The TFEL structure of claim 1 wherein said alkaline earth thiogallate is selected from calcium thiogallate and calcium strontium thiogallate.

4. The TFEL structure of claim 1 wherein said phosphor layer includes a rare earth dopant.

5. The TFEL structure of claim 1 wherein said phosphor layer includes a dopant, said dopant is selected from the group europium, holmium, cerium, lead and tin.

6. The TFEL structure of claim 1 wherein said alkaline earth thiogallate is calcium strontium thiogallate, $Ca_xSr_{1-x}Ga_2S_4$, and $0<x<1$.

7. The TFEL structure of claim 6 wherein x=0.5 and said alkaline earth thiogallate is calcium strontium thiogallate, $Ca_{0.5}Sr_{0.5}Ga_2S_4$.

8. The TFEL structure of claim 6 wherein x=0.4 and said alkaline earth thiogallate is calcium strontium thiogallate, $Ca_{0.4}Sr_{0.6}Ga_2S_4$.

9. The TFEL structure of claim 6 wherein x=0.6 said alkaline earth thiogallate is calcium strontium thiogallate, $Ca_{0.6}Sr_{0.4}Ga_2S_4$.

10. The TFEL structure of claim 6 wherein said TFEL stack includes a layer of zinc sulfide sandwiched between said phosphor layer and one of said first and second insulator layers.

11. The TFEL structure of claim 1 wherein said TFEL stack includes a layer of zinc sulfide sandwiched between said phosphor layer and one of said first and second insulator layers.

12. The TFEL structure of claim 1 wherein said oxygen concentration is between 2 to 6 at. %.

* * * * *